July 4, 1933.  K. F. GALLIMORE ET AL  1,916,212
INDICATOR LOCATING DEVICE
Filed Aug. 16, 1928  2 Sheets-Sheet 1
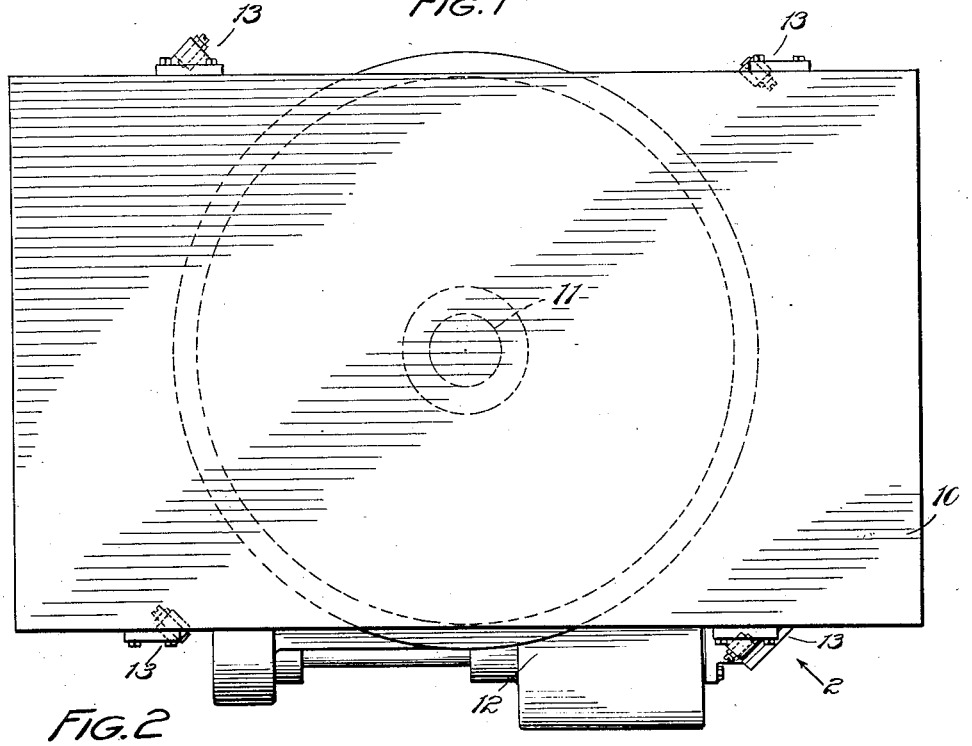
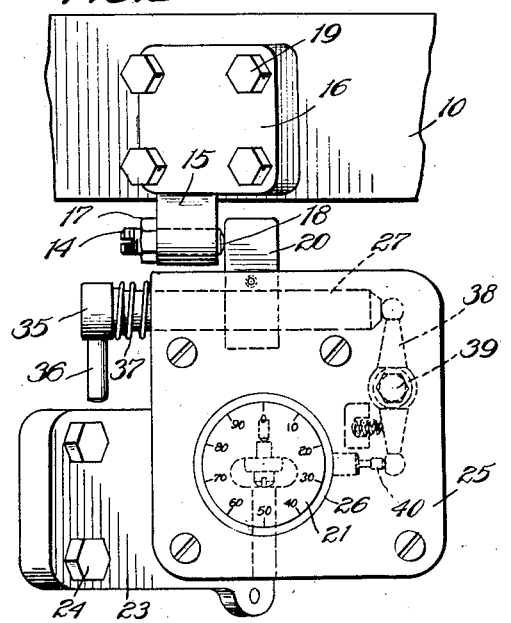
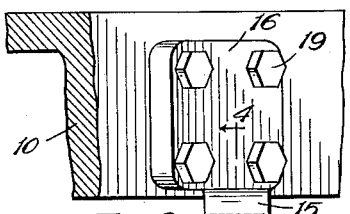
Inventors
Keith F. Gallimore
Raymond M. Weytych

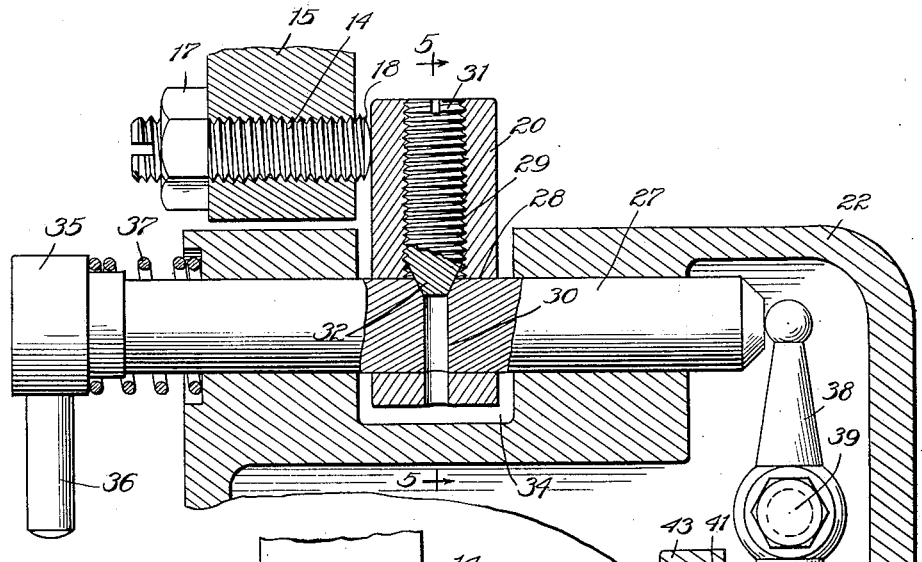
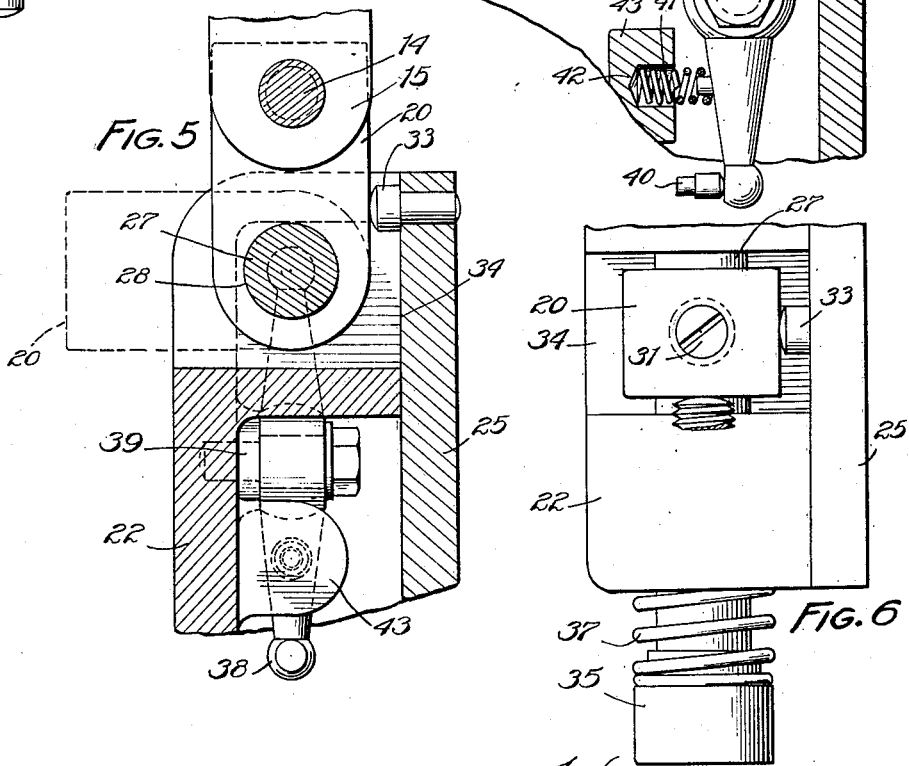

Patented July 4, 1933

1,916,212

UNITED STATES PATENT OFFICE

KEITH F. GALLIMORE AND RAYMOND M. WOYTYCH, OF FOND DU LAC, WISCONSIN, ASSIGNORS TO GIDDINGS & LEWIS MACHINE TOOL CO., OF FOND DU LAC, WISCONSIN, A CORPORATION OF WISCONSIN

INDICATOR LOCATING DEVICE

Application filed August 16, 1928. Serial No. 299,954.

The present invention relates to improvements in indicator locating devices for indexing moving fixtures.

In indexing machine tool fixtures, for example rotatable tables, it is important that the fixture be accurately located after each indexing movement. Various means employed heretofore for this purpose because of play etc. are inaccurate, and are difficult to readjust if the correct position is lost. The primary objects of the present invention therefore reside in the provision of a novel indicator locating device which is highly accurate, which is readily adjustable, and which causes the indicator to register any accidental or undesired displacement of the movable or rotatable fixture so that an accurate readjustment can be made.

Further objects reside in the provision of a new and improved indicator locating device which is permanently associated with the fixture, which can be adjusted easily and quickly to permit free movement of the fixture past any position of index, in which no error can enter because of lost motion, and which is relatively simple and inexpensive in construction.

Further objects and advantages will become apparent as the description proceeds.

In the accompanying drawings, Figure 1 is a plan view of a rotatable table to which a device embodying the features of our invention is applied.

Fig. 2 is a view taken in the direction of the arrow in Fig. 1 and showing the device in elevation.

Fig. 3 is an end view of the device.

Fig. 4 is a vertical sectional view along line 4—4 of Fig. 3.

Fig. 5 is a fragmentary sectional view taken along line 5—5 of Fig. 4.

Fig. 6 is a fragmentary plan view.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring to the exemplary embodiment illustrated in the drawings, the device is adapted to be used for locating a large variety of machine fixtures movable into different positions. In the present instance, we have shown a rotatable work table 10 mounted on a vertical shaft 11 in a machine base 12. Any suitable means (not shown) may be provided for rotatably adjusting the table 10. The table 10 is adapted to be adjusted or indexed selectively into different angular positions, in the present instance, four equally spaced positions. To this end, a plurality of stops 13 are mounted in spaced relation on the table 10, and are adapted respectively to coact with the indicator locating device to accurately locate the table in the desired position.

The stops 13 may be of any suitable construction, and in the present instance, each stop comprises a stop screw 14 threaded through a depending lug 15 formed on a supporting plate 16. The stop screw 14 is adapted to be secured in the desired position of adjustment in the lug 15 by means of a lock nut 17, and has a smooth rounded contact end 18. The plate 16 is secured to the side edge of the table 10 in the desired position by means of a plurality of screw bolts 19. In the present instance, the lug 15 is inclined to the plate 16 so that the stop screw 14 will be disposed tangentially to its line of movement. All of the stop screws 14 extend forwardly in the direction of movement in the table 10.

The stop screws 14 are adapted to coact selectively with a dog 20 forming part of the indicator locating device which is mounted, preferably on the base 12 under the table 10, in a position to locate the table in any one of its positions of index. The dog 20 is operatively connected through mechanism hereinafter described to a dial indicator 21 of suitable construction mounted in a casing 22. The casing 22 is formed integral with a suitable supporting bracket 23 secured to the base 12 by means of bolts 24, and is closed by a removable cover plate 25 having a circular opening 26 exposing the dial indicator 21.

The dog 20 is adapted to project upwardly from the casing 22 into the orbit of the stops 13, and to this end is rigidly secured on a plunger 27 slidably and rotatably mounted in the upper wall of the casing. The face of the dog 20 adapted to be engaged by the stops 13 is smoothly finished. Preferably, the lower end of the dog 20 has a transverse bore 28 receiving the plunger 27, and has a longitudinal bore 29 in alinement, with a transverse bore 30 in the plunger. The dog 20 is secured to the plunger by means of a screw 31 in the bore 29, said screw having a beveled inner end 32 extending into the beveled end of the bore 30.

The dog 20 is pivotal with the plunger 27 into and out of position for engagement by the stops 13. A suitable stop pin 33 is secured to the plate 25, and serves to define the operative position for the dog 20. The dog 20 is freely disposed in a recess 34 formed in the upper wall of the casing. This recess permits the pivotal movement of the dog 20, and a limited movement endwise of the plunger 27. Secured to the outer end of the plunger 27 is a suitable head 35 in which is secured an operating handle 36. A coil spring 37 is disposed on the plunger 27, and abuts at its ends against the adjacent wall of the casing 22 and the head 35. The spring 37 tends to move the dog 20 forwardly to one side of the recess 34.

The inner end of the plunger 27 is disposed in abutting engagement with one rounded end of a lever 38 pivoted intermediate its ends on a pin 39 in the casing 22. The other rounded end of the lever 38 abuts against the end of the spring-pressed actuating stem 40 for the dial indicator 21. A coil spring 41 resting at one end in a seat 42 formed in a lug 43 in the casing 22 impinges at its other end against the lever 38 to hold the latter in engagement with the plunger 27.

In operation, when the table 10 is to be indexed, the dog 20 is pivoted out of the path of the coacting stop screw 14. The springs 37 and 41 immediately move the dog 20 forwardly so that the indicator registers a negative reading. After the stop screw 14 has been moved past the dog 20, the latter is returned to operative position, and the table is then indexed to bring the next stop screw 14 into engagement with the dog to move the dog rearwardly until the indicator registers a zero reading. The table 10 now is in the desired position, and may be clamped in place.

It will be noted that the device serves to accurately position the table after each indexing movement. The coacting surfaces are not subject to wear or lost motion tending to destroy the accuracy of the readings. The device can be easily and quickly adjusted, and serves to indicate any displacement of the table from adjusted position.

We claim as our invention:

1. A locating device for adjustable parts comprising, in combination, a stop adapted to be secured to the adjustable part, and an indicating mechanism adapted to be mounted in fixed position relative to movement of said part, said indicating mechanism comprising an indicator having an actuating member, a casing enclosing said indicator, a plunger slidably mounted in said casing, said plunger being slidable in the general direction of movement of said part, a dog secured for movement with said plunger for engagement by said stop, spring means resisting sliding movement of said plunger by said stop, means for limiting the sliding movement of said plunger, and a lever engaging at opposite ends respectively with said member and one end of said plunger.

2. A locating device for rotary tables comprising, in combination with a table, a stop on said table, an indicating mechanism fixed against movement with said table, said indicating mechanism comprising an indicator having an actuating stem, a support, a plunger slidably and rotatably mounted in said support, a dog fixed on said plunger for movement into and out of position for engagement by said stop, and a lever mounted for engagement with said stem and said plunger to translate movement of said dog by said stop to said stem.

3. A locating device for adjustable parts comprising, in combination, a stop adapted to be secured to the adjustable part, and an indicating mechanism comprising a casing, a dial indicator in said casing and having an actuating stem, a plunger slidably and rotatably mounted in said casing, a dog mounted on said plunger for movement into and out of position for engagement by said stop, spring means tending to press said plunger toward said stop, a lever mounted intermediate its ends respectively for engagement at opposite ends with the end of said stem and one end of said plunger, and spring means tending to hold said lever in engagement with said plunger.

4. A locating device for rotary tables adapted to be indexed into different positions, comprising, in combination, a plurality of fixed stops mounted on said table in spaced relation and adjustable tangentially thereto, an indicator, a supporting member, a dog mounted on said member for pivotal movement into and out of the orbit of said stops, and for sliding movement by said stops, spring means for resisting movement of said dog by said stops, and means for translating the movement of said dog to said indicator.

5. A locating device for rotary tables adapted to be indexed into different positions, comprising, in combination, a plurality of stops mounted in spaced relation on a table, a casing fixed relative to movement of said table, an indicator in said casing, a member slidably mounted in said casing, a dog secured to said member for movement therewith and for selective engagement with said stops, spring means engaging said member for resisting movement of said dog by said stops, means for translating the movement of said member to said indicator and spring means for taking up play in said translating means.

6. A locating device for rotary tables comprising, in combination with a table, a stop mounted on said table for adjustment tangentially thereto, an indicating mechanism fixed against movement with said table, said mechanism comprising an indicator having an actuating member, a support, a plunger slidably mounted in said support, a dog mounted on said plunger for movement in one direction by said stop, said dog and said stop being relatively adjustable in another direction into and out of position for engagement, and means for translating the movement of said plunger by said stop in said one direction to said member.

7. A locating device for movable tables comprising, in combination, a stop adapted to be secured to a moving table, an indicator having an actuating stem and a spring tending to hold said stem extended, a movable dog adapted to coact with said stop, spring means for resisting movement of said dog by said stop, means operatively connecting said dog and said indicator, and spring means for taking up all lost play in said connecting means, said first mentioned spring holding said indicator stem in contact with said connecting means.

8. A locating device for movable tables comprising, in combination, a stop adapted to be secured to a moving table, a casing fixed relative to the movement of said table, an indicator mounted in said casing, a plunger rotatably and slidably mounted in said casing, a dog adapted to coact with said stop and secured on said plunger for movement therewith, said plunger on rotation being adapted to move said dog out of the path of said stop, and means operatively connecting said plunger to said indicator to transmit the sliding movement of said plunger to said indicator.

9. A locating device for a movable part adapted to be located selectively in any one of a series of positions on a fixed supporting part, said device comprising, in combination, a plurality of stops one for each of said positions on one of said parts, said stops being individually adjustable relative to each other in the direction of movement of said movable part, and an indicating mechanism mounted on the other of said parts, said mechanism having an indicator with an actuating member, an intermediate member, an abutment dog on said intermediate member and adapted for selective engagement by any one of said stops, said intermediate member being movable with said dog in one direction upon said engagement and operatively connected to said actuating member to adjust said indicator in accordance with the movement of the engaging stop, said dog being movable in another direction independently of said actuating member selectively into or out of position for engagement by said stops, and yieldable means in said indicating mechanism for resisting adjustment of said indicator by said stops.

In testimony whereof we have hereunto affixed our signatures.

KEITH F. GALLIMORE.
RAYMOND M. WOYTYCH.